(12) United States Patent
Chiu et al.

(10) Patent No.: US 9,638,418 B2
(45) Date of Patent: May 2, 2017

(54) OXYGEN FIRED STEAM GENERATOR

(75) Inventors: John H. Chiu, West Hartford, CT (US); George D. Mylchreest, Simsbury, CT (US)

(73) Assignee: General Electric Technology GmbH, Baden (CH)

( * ) Notice: Subject to any disclaimer, the term of this patent is extended or adjusted under 35 U.S.C. 154(b) by 1590 days.

(21) Appl. No.: 12/468,290

(22) Filed: May 19, 2009

(65) Prior Publication Data
US 2010/0294180 A1 Nov. 25, 2010

(51) Int. Cl.
*F23L 7/00* (2006.01)
*F23C 10/10* (2006.01)

(52) U.S. Cl.
CPC .............. *F23L 7/007* (2013.01); *F23C 10/10* (2013.01); *F23C 2206/103* (2013.01); *Y02E 20/344* (2013.01)

(58) Field of Classification Search
CPC .......... F23C 10/02; F23C 10/04; F23C 10/08; F23C 10/10
USPC .......................................... 110/245; 122/4 D
See application file for complete search history.

(56) References Cited

U.S. PATENT DOCUMENTS

| | | | | |
|---|---|---|---|---|
| 4,084,545 | A * | 4/1978 | Nack et al. | 110/245 |
| 4,193,773 | A * | 3/1980 | Staudinger | 110/101 R |
| 4,823,712 | A * | 4/1989 | Wormer | 110/245 |
| 4,969,930 | A * | 11/1990 | Arpalahti | 110/347 |
| 5,344,629 | A * | 9/1994 | Engstrom | 423/239.1 |
| 6,505,567 | B1 * | 1/2003 | Anderson et al. | 110/243 |
| 7,331,313 | B2 * | 2/2008 | Weissinger et al. | 122/4 D |
| 8,196,532 | B2 * | 6/2012 | Andrus et al. | 110/245 |
| 2004/0261671 | A1 * | 12/2004 | Taylor | 110/261 |

FOREIGN PATENT DOCUMENTS

DE 19703197 8/1998

OTHER PUBLICATIONS

PCT International Search Report and The Written Opinion of the International Searching Authority dated Jul. 27, 2010—(PCT/US2010/034439).

* cited by examiner

*Primary Examiner* — David J Laux
(74) *Attorney, Agent, or Firm* — GE Global Patent Operation; Cynthia W. Flanigan

(57) ABSTRACT

In a method for operating a steam generator, a transport reactor is provided. Only a substantially pure oxygen feed stream is introduced into the transport reactor in an amount sufficient to maintain the transport reactor at or above a specific system load. The specific load is the system load when only the substantially pure oxygen feed stream is provided to the transport reactor at a minimum flow velocity for operating the transport reactor. A fuel is combusted in the presence of the substantially pure oxygen feed stream to produce a flue gas, which contains solid material. The solid material is separated from the flue gas and passed to a heat exchanger. The heat exchange may be one of a moving bed heat exchanger or a fluidized bed heat exchanger. The solid material is directed to the transport reactor to contribute to the combustion process.

20 Claims, 2 Drawing Sheets

US 9,638,418 B2

OXYGEN FIRED STEAM GENERATOR

FIELD

The specification herein generally relates to steam generators and is more particularly related to steam generators wherein substantially pure oxygen is fed into a transport reactor.

BACKGROUND

Steam generators, particularly those of the coal fired type, can generate harmful emissions. Recent efforts have focused on oxygen firing which, due to the elimination of the inherent nitrogen that occurs with air firing, results in an essentially pure carbon dioxide product gas which can be more efficiently sequestered. Most oxygen fired steam generators utilize significant gas recirculation in order to maintain the required mass flow through the steam generator to support the heat transfer processes. Gas recirculation at high rates adds considerable cost, complexity, and increases the need for auxiliary power.

Pulverized coal steam generators rely on furnace area for controlling heat transfer. These systems inherently also require substantial gas recirculation in order to maintain furnace and convective surface velocities.

SUMMARY

In one aspect, a method for operating a steam generator includes employing a transport reactor wherein substantially pure oxygen feed stream is the only externally supplied gas introduced during the combustion process in an amount sufficient to raise the flow velocity through the reactor to a desired flow velocity above a minimum threshold flow velocity. Therefore, the amount of substantially pure oxygen added will vary depending on the desired flow rate through the transport reactor. As used herein, the term "substantially pure oxygen" should be construed to mean a gas comprising 95-100% oxygen. During operation, when the transparent reactor is operating at substantially full load, the fuel and substantially pure oxygen are combusted to generate flue gas having ash and other hot solids forming a part thereof. Subsequent to combustion, the flue gas is separated into an end product portion and a recycled product portion. The recycled product portion is passed through a heat exchanger of the moving bed or fluidized bed type. Heat from the hot flue gas is transferred to a working fluid such as, but not limited to, water, water vapor or steam, forming part of the heat exchanger. The recycled product portion is then directed to the transport reactor to contribute to the combustion process.

In an embodiment, the separator is a cyclone and the transport reactor operates at a flow rate of between about 30 ft/sec. to about 50 ft/sec. In this embodiment, the heat exchanger is a moving bed heat exchanger (MBHE) in fluid communication with an outlet of the separator. The moving bed heat exchanger includes a bypass that allows a portion of the recycled product portion to bypass the tubular heat exchangers that form part of the MBHE, thereby providing a greater degree of temperature control in the transport reactor by allowing a portion of the hot combustion products to bypass the heat exchanger and be returned to the transport reactor. The transport reactor can also include an inlet through which supplemental air or supplemental inert gas can be introduced into the transport reactor. The supplemental air or inert gas is introduced into the when the flow velocity through the reactor is below a minimum threshold level. Adding the supplemental air or inert gas raises the flow velocity through the transport reactor to at least the threshold velocity at which point the substantially pure oxygen can be introduced.

A steam generator is also described and includes a transport reactor that defines an inlet and an outlet. A separator is provided and has an inlet in fluid communication with the outlet of the transport reactor for receiving and separating flue gas produced thereby into an end product portion that passes through a first outlet defined by the separator and a recycled product portion that passes through a second outlet defined by the separator. An MBHE or a fluid bed heat exchanger is positioned downstream of the second outlet of the separator and has an inlet in fluid communication therewith. The heat exchanger also includes an outlet in fluid communication with the inlet of the transport reactor. The transport reactor can include an inlet through which supplemental air or supplemental inert gas can be provided to maintain the transport reactor throughput under less than substantially full load conditions. Once substantially full load conditions are achieved, the addition of the supplemental air or inert gas can be discontinued and at this point, only substantially pure oxygen can be fed to the transport reactor. When operating at substantially full load, the substantially pure oxygen is the only gas externally supplied to the transport reactor.

In one embodiment, prior to entering the transport reactor, the substantially pure oxygen feed stream passes through an oxygen preheater positioned downstream of the first outlet of the separator. The oxygen preheater is in fluid communication with the end product portion and the substantially pure oxygen feed stream, so that heat is transferred from the end product portion of the flue gas to the substantially pure oxygen feed stream.

The above-described and other features are exemplified by the following figures and detailed description.

BRIEF DESCRIPTION OF THE DRAWINGS

Referring now to the figures, which are exemplary embodiments, and wherein like elements are numbered alike.

DETAILED DESCRIPTION

Figure 1:
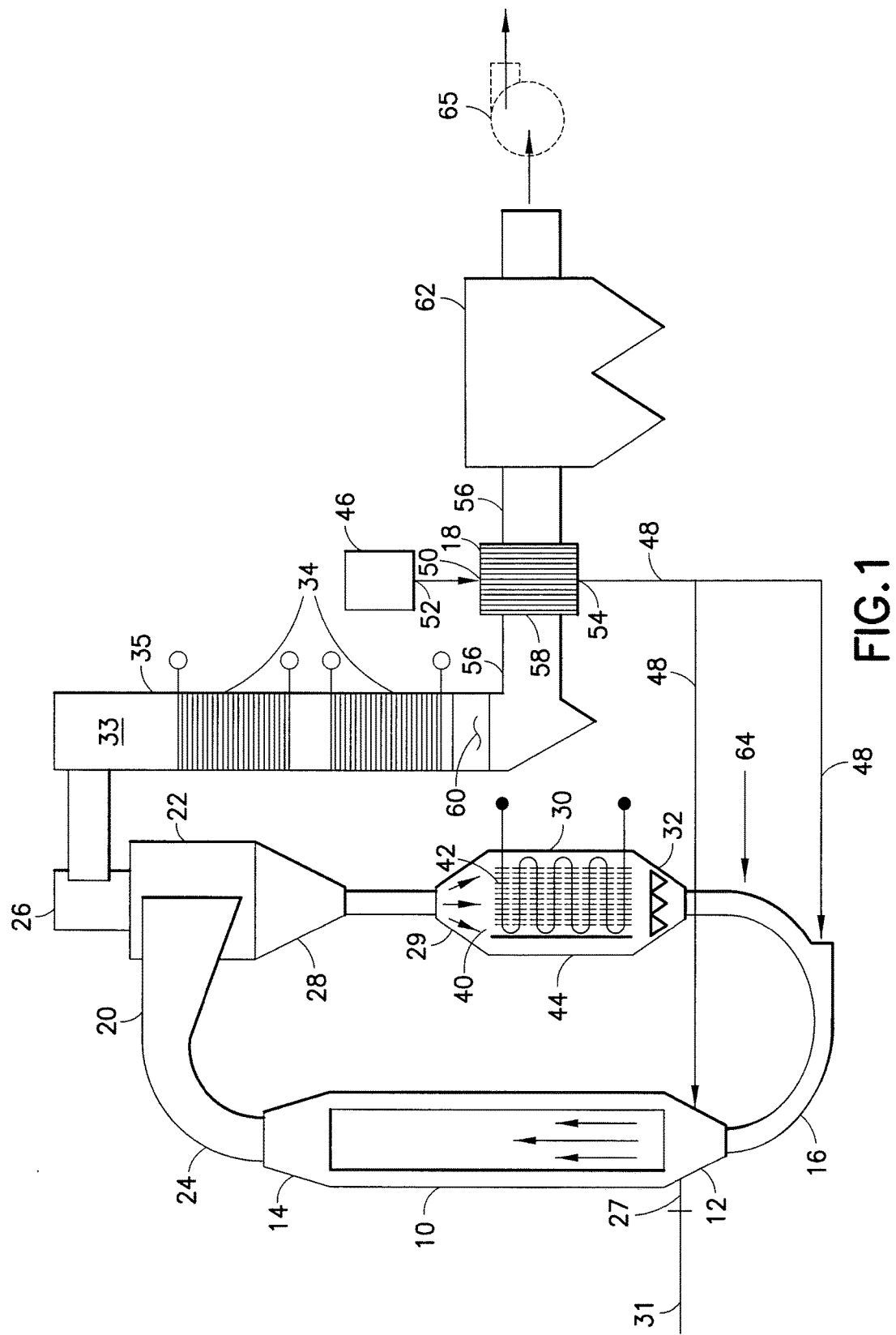
FIG. 1 is a schematic illustration of a steam generator that employs a moving bed heat exchanger.

As shown in FIG. 1, a transport reactor generally designated by the reference number 10 operates as a combustor and defines an inlet 12 and an outlet 14. Solid fuel 64, such as, but not limited to, coal, is fed into the transport reactor. When the transport reactor 10 is operating at or above a specific system load, substantially all the transport gas is provided by conduits 16 and 48. The specific system load is defined by the condition when all or substantially all the transport gas is provided by conduits 16 and 48 at a minimum flow velocity for operating the transport reactor 10. The minimum flow velocity is defined by the design and parameters of the transport reactor and solid fuel, such as the dimensions of the transport reactor and solid fuel. Prior to being fed into the combustor, a portion or substantially all of the transport gas can be heated in an oxygen preheater 18 (explained in greater detail below). The combustor outlet 14 is coupled to an inlet 20 of a separator 22 via a conduit 24.

Figure 2:
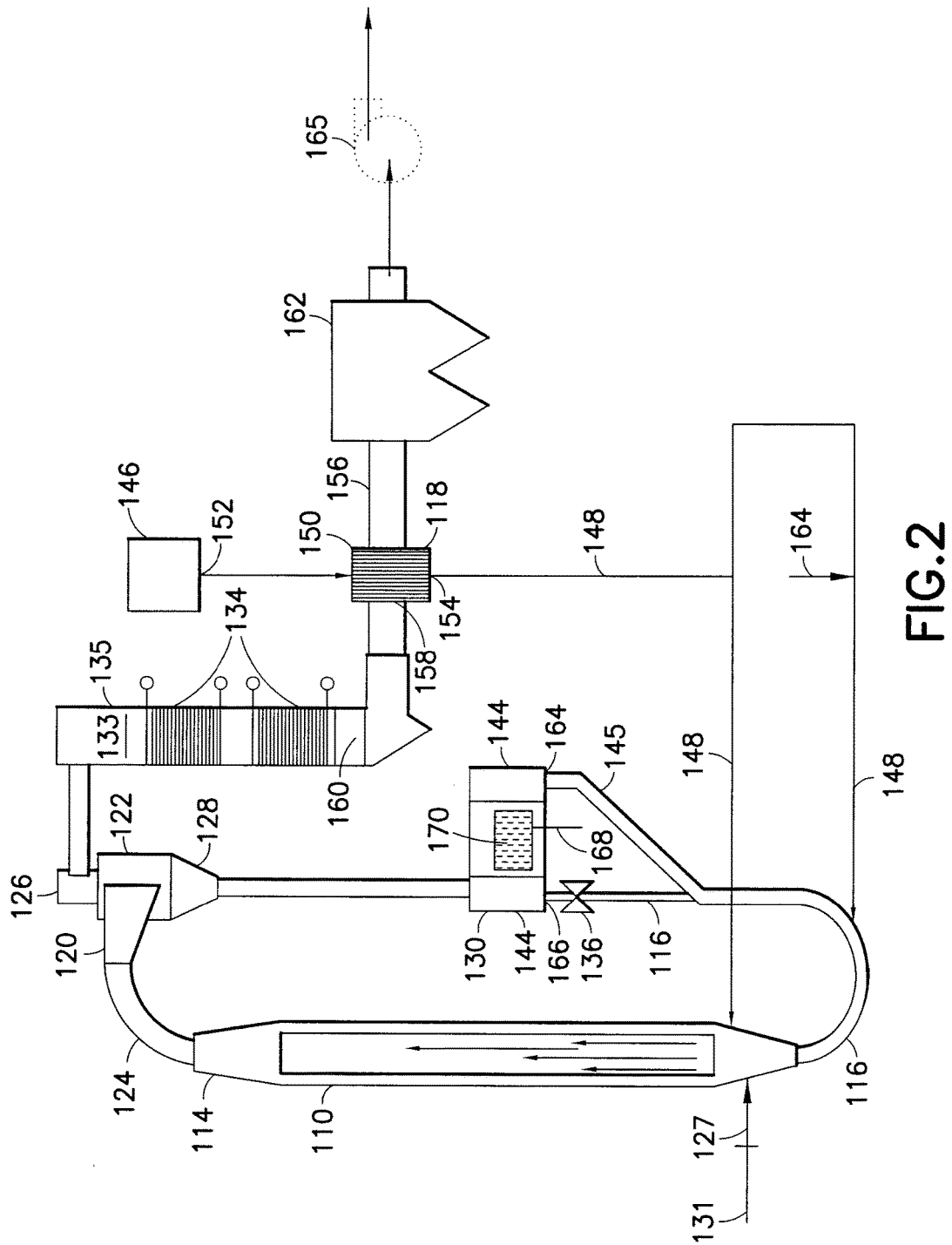
FIG. 2 is a schematic illustration of a steam generator that employs a fluidized bed heat exchanger.

As shown in the illustrated embodiment, the separator 22 is a cyclone having an upper outlet 26 for discharging an end product portion of the flue gas and a lower outlet 28 for discharging a recycled product portion of the flue gas that includes heated solids that were not consumed during residence in the combustor 10 as well as ash generated during the combustion process. The lower outlet 28 of the cyclone 22 is in fluid communication with an inlet 29 of a heat exchanger 30, shown in the illustrated embodiment as a "Moving Bed Heat Exchanger" (MBHE), explained in greater detail below. While an MBHE has been shown, the present invention is not limited in this regard as other types of heat exchangers known to those skilled in the pertinent art to which the present invention pertains, such as, but not limited to, a "Fluid Bed Heat Exchanger" (FBHE), as shown in FIG. 2 and explained in detail below, can be substituted.

The transport gas flowing through conduits 16 and 18 is a substantially pure oxygen feed stream, which comprises substantially pure oxygen, provided by an oxygen source 46, and possibly other residual gas infiltrated from the heat exchanger 30, the solid fuel source, and/or the oxygen preheater 18. The substantially pure oxygen feed stream comprises of approximately 90-100% of oxygen. As suggested, the oxygen purity of the substantially pure oxygen feed stream can be affected by the addition of fluidizing gas, such as air, into heat exchangers forming part of the embodiments described herein. While air has been described as the fluidizing gas for the heat exchangers, the present invention is not limited in this regard as other gases such as, but not limited to, flue gas and substantially pure oxygen can also be employed.

Still referring to FIG. 1, a supplemental gas line 31 is coupled to an inlet 27 to the transport reactor 10. During operation, if the transport reactor 10 is operating at less than the minimum flow velocity for a desired system load, supplemental air or inert gas, such as, but not limited to, flue gas can be introduced into the transport reactor via the gas line 31 in order to raise the flow velocity through the transport reactor to at least the minimum flow velocity. At this point the substantially pure oxygen feed stream can be introduced into the transport reactor. The amount of substantially pure oxygen feed stream introduced into the transport reactor will be governed by the desired system load through the transport reactor.

An outlet 32 of the MBHE 30 is in fluid communication with the conduit 16 so that after passing through the MBHE, the above-described recycled product portion is mixed in the conduit with the substantially pure oxygen feed stream and the fuel being fed therein and is transported into the combustor 10 through the combustor inlet 12.

The end product portion of the flue gas exits the cyclone 22 via the upper exit 26 and flows into a backpass volume 33 defined by a backpass duct 35. Heat exchangers 34 are in communication with the backpass duct 35 and employ a working fluid such as steam, water, or water vapor that is fed through tubes and/or coils forming part of the heat exchangers. Via conduction and convection, the hot end product portion of the flue gas flows past the heat exchangers 34, thereby heating the working fluid to the desired temperatures.

Subsequent to the end product portion of the flue gas passing through the backpass volume 33, the end product portion flows through the oxygen preheater 18, as explained in greater detail below, to preheat the substantially pure oxygen prior to its introduction into the combustor 10.

As described above, the lower outlet 28 of the cyclone 22 is in fluid communication with the MBHE 30. The MBHE 30 defines an interior area 40 into which the recycled product portion of the flue gas flows after being discharged from the lower cyclone outlet 28. The MBHE 30 is a counterflow direct contact heat exchanger that employs a mass flow of solids that move downward through a series of tubular heat exchangers 42. Heat from the combustion products is transferred to the tubular heat exchangers to heat a working fluid, such as, but not limited to, steam, to the desired process temperatures. The tubular heat exchangers 42 can employ fins to increase the heat transfer area. The heat transfer mechanism of the MBHE 30 is dominated by conduction and convection with the heat transfer rates being higher than those achieved using gas-only convection. While the MBHE 30 has been described as a counterflow direct contact heat exchanger, it is not limited in this regard as the heat exchanger can also be of the parallel flow type.

The MBHE 30 shown in the illustrated embodiment is equipped with a bypass 44 to allow some of the recycled product portion of the flue gas to bypass the tubular heat exchangers 42. This provides for a greater degree of temperature control in the combustor 10 by allowing a portion of the hot combustion products to bypass the heat exchanger and be returned to the combustor.

During operation of the transport reactor 10 at or above the specific system load, the substantially pure oxygen feed stream is all or substantially all the gas introduced into the transport reactor. Due to its low gas weight and higher combustor velocity, using substantially pure oxygen in this manner allows for combustor/furnace areas to be drastically reduced, in some instances by over 80% compared to air fired "Circulating Fluidized Beds" (CFB). Moreover, gas recirculation is not employed and instead the discharge pressure of the oxygen source 46 (explained below) that feeds the substantially pure oxygen into the conduit 16 operates as the primary draft source.

The substantially pure oxygen is supplied to the transport reactor 10 from an oxygen source 46 via the oxygen introduction elements 48. The substantially pure oxygen supplied by the oxygen source 46 is preheated upstream of the oxygen introduction elements 48, by the oxygen preheater 18. The oxygen preheater 18 includes a cold side inlet 50 in communication with an exit 52 defined by the oxygen source 46. The oxygen preheater 18 includes an oxygen outlet 54 in fluid communication with the oxygen introduction elements 48 for introducing heated substantially pure oxygen thereto. The end product portion of the flue gas supplied from the backpass volume 33 flows through a conduit 56 that communicates with a hot side inlet 58 of the oxygen preheater.

The substantially pure oxygen supplied by the oxygen source 46 can be generated by an air separation unit that separates oxygen from an ambient air feed stream. Accordingly, the oxygen source 46 can be configured by a cryogenic plant. The oxygen source 46 can also be configured as an apparatus comprising an oxygen transport membrane.

As shown in FIG. 1, a mechanism 62 for capturing byproducts of the combustion process such as, but not limited to, particulate and sulfur dioxide, is positioned downstream of the oxygen preheater 18 and in the illustrated embodiment is in communication with the conduit 56.

The combustor 10 shown in the illustrated embodiment is a transport reactor wherein the flow rate of combustion gases and solids (ash and unconsumed fuel) is preferably between about 30 ft/sec. to about 50 ft/sec. However, the present invention is not limited in this regard as any effective flow rate known to those skilled in the pertinent art to which the present description pertains may be employed.

The transport reactor 10 operates at higher temperatures than conventional reactors. Typically, the transport reactor is operated at temperatures just below the ash fusion temperature of the fuel being used. This temperature is generally about 2000° F.; however, depending on the fuel fed into the combustor, this temperature can vary somewhat. Due to these high operating temperatures, $N_2O$ is typically destroyed and is not a byproduct of the combustion process. However, $NO_x$ is generated during the combustion process. Accordingly, a selective catalytic reactor (SCR) 60 is positioned in the bypass duct 33 downstream of the heat exchangers 34 to remove $NO_x$ from the end product portion of the flue gas. A capture mechanism 62 is positioned downstream of the oxygen preheater 18 for capturing sulfur dioxide ($SO_2$) and particulate present in the flue gas. In the illustrated embodiment, the capture mechanism is in communication with the conduit 56.

Still referring to FIG. 1, if needed, an induced draft (ID) fan 65 can be provided.

Turning to FIG. 2, the embodiment shown therein is similar to that shown in FIG. 1. Accordingly, like elements will be given like reference numbers preceded by the numeral 1. The embodiment of FIG. 2 differs from that shown in FIG. 1 in that instead of the MBHE 30, the system of FIG. 2 employs a fluid bed heat exchanger (FBHE) 130 and a throttle valve 131. The FBHE 130, shown in the illustrated embodiment, employs a bypass 144. The bypass 144 has a first exit 164 in fluid communication with the conduit 145 that in turn is in fluid communication with conduit 116 and a second exit 166 that is in fluid communication with the throttle valve 131. The throttle valve 136 is also in fluid communication with the conduit 116 so that during operation, the throttle valve can be operated to allow more or less of the hot combustion products to flow back into the combustor 110, thereby controlling the temperature therein.

The FBHE 130 is in gaseous communication with a fluidizing gas supply line 168. The supply line 168 is employed to introduce a fluidizing gas, such as, but not limited to air, flue gas, or substantially pure oxygen into a fluidized bed 170 forming part of the FBHE.

The embodiments described herein employ the use of substantially pure oxygen being fed into the transport reactor 10. An advantage of configuring a steam generator in this manner is that the complexity of the steam generator is reduced. Due to the low gas weight and higher combustor velocity, the combustor furnace area can be significantly reduced over that required by conventional air-fired CFB steam generators.

The embodiments described herein separate the combustion and the heat transfer processes, thereby allowing for more effective heat transfer in the heat exchangers.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to a particular embodiment disclosed as the best mode contemplated for carrying out this invention, but that the invention will include all embodiments falling within the scope of the appended claims.

What is claimed is:

1. A method for operating a steam generator comprising:
   providing a transport reactor;
   introducing only a substantially pure oxygen feed stream into said transport reactor in an amount sufficient to maintain the transport reactor at or above a specific system load, whereby the specific system load is the system load when only the substantially pure oxygen feed stream is provided to the transport reactor at a minimum flow velocity for operating said transport reactor;
   introducing a fuel into the transport reactor, wherein the fuel and the substantially pure oxygen are mixed prior to being introduced into the transport reactor and the resulting mixture is introduced into the transport reactor via the same inlet;
   combusting the fuel in the presence of said substantially pure oxygen feed stream to produce a flue gas, said flue gas containing solid material;
   separating said solid material from the flue gas;
   passing the solid material to a heat exchanger;
   mixing the solid material with the substantially pure oxygen feed stream and fuel prior to directing the mixture of the solid material, the substantially pure oxygen feed stream, and the fuel to said transport reactor to contribute to the combustion process occurring within the transport reactor; and
   directing the mixture of the fuel, substantially pure oxygen feed stream, and solid material into said transport reactor to contribute to the combustion process.

2. A method as defined by claim 1 wherein said substantially pure oxygen feed stream consists of 90-100% oxygen.

3. A method as defined by claim 1 wherein subsequent to separating said flue gas, said method further includes passing separated flue gas portion through an oxygen preheater at which heat from the flue gas is transferred to said substantially pure oxygen feed stream.

4. A method as defined by claim 3 wherein said separator is a cyclone and said method further includes subsequent to said separating and prior to passing said separated flue gas product portion through said oxygen preheater, said separated flue gas portion of said flue gas is directed into a backpass volume having at least one heat exchanger in communication therewith at which heat from said separated flue gas portion is transferred to a working fluid flowing through said at least one heat exchanger.

5. A method as defined by claim 1 further comprising:
   providing an inlet into said transport reactor;
   providing at least one of supplemental air and supplemental inert gas through said inlet and thereby into said transport reactor when said transport reactor is operating at a velocity below a minimum threshold flow velocity in an amount sufficient to raise said flow velocity through said transport reactor at least to said minimum threshold velocity.

6. A method as defined by claim 1 wherein the heat exchanger is a fluidized bed heat exchanger and said method further includes providing an inlet into said fluidized bed heat exchanger; and introducing a fluidizing gas, via said inlet, into said inlet of said fluidized bed heat exchanger.

7. A method as defined by claim 6 wherein said fluidizing gas is at least one of flue gas, air, and substantially pure oxygen.

8. A method as defined by claim 1 wherein the heat exchanger is one of a moving bed heat exchanger and a fluid bed heat exchanger which include a bypass for allowing at least a portion of said solid material to flow therethrough, and said method further includes controlling temperature in said transport reactor by operating said bypass.

9. A method as defined by claim 8 wherein said heat exchanger is a fluid bed heat exchanger, said method includes providing a throttle valve in fluid communication with said bypass and in fluid communication with said transport reactor; and
operating said throttle valve to control the rate at which said solid material portion is directed into said transport reactor, thereby controlling the temperature within said transport reactor.

10. A method as defined by claim 1 wherein said transport reactor operates at a flow rate of between about 30 ft/sec. to about 50 ft/sec.

11. A method as defined by claim 1 wherein the combusting of the fuel includes operating said transport reactor at a temperature approaching an ash fusion temperature defined by said fuel.

12. A method as defined by claim 11 wherein said substantially pure oxygen feed stream comprises 90-100% oxygen.

13. A method as defined by claim 11 wherein introducing a substantially pure oxygen feed stream into said transport reactor occurs when said transport reactor is operating at substantially full load, the method comprising introducing said substantially pure oxygen feed stream into said transport reactor at a rate and pressure sufficient to cause said substantially pure oxygen feed stream to function as a primary draft source for the steam generator.

14. A method as defined by claim 1 wherein the heat exchanger is a moving bed heat exchanger.

15. A method for operating a steam generator, said method comprising:
providing a transport reactor;
introducing only a substantially pure oxygen feed stream into said transport reactor in an amount sufficient to maintain a desired flow velocity, above a minimum threshold velocity through said transport reactor;
introducing a fuel into the transport reactor, wherein the fuel and the substantially pure oxygen are mixed prior to being introduced into the transport reactor and the resulting mixture is introduced into the transport reactor through an inlet in the transport reactor;
combusting the fuel in the presence of said substantially pure oxygen feed stream to produce a flue gas, said flue gas containing solid material, at least a portion of which is hot ash;
providing a cyclone having an inlet in fluid communication with an exit defined by said transport reactor so that said flue gas is directed into said cyclone;
said cyclone operating to separate said flue gas into an end product portion and a recycled product portion;
passing the recycled product portion which includes at least a portion of said hot ash of said solid material, through a moving bed heat exchanger in fluid communication with an outlet of said cyclone;
passing the end product portion through an oxygen preheater at which heat from the flue gas is transferred to the substantially pure oxygen feed stream;
mixing the recycled product portion with the substantially pure oxygen feed stream and fuel to form a mixture prior to the mixture being directed to the transport reactor for further combustion; and
directing the mixture of the fuel, substantially pure oxygen feed stream, and the recycled product portion into the transport reactor to contribute to the combustion process.

16. A method as defined by claim 15 wherein said substantially pure oxygen feed stream consists of 95-100% oxygen.

17. A method as defined by claim 16 further comprising providing an inlet into said transport reactor; and providing at least one of supplemental air and supplemental inert gas through said inlet and thereby into said transport reactor when said transport reactor is operating at a velocity below a minimum threshold velocity in an amount sufficient to raise said flow velocity through said transport reactor at least to said minimum threshold velocity.

18. A method as defined by claim 16 wherein said transport reactor operates at a flow rate of between about 30 ft/sec. to about 50 ft/sec.

19. A method as defined by claim 15 wherein said method includes, subsequent to separating said flue gas and prior to passing said end product portion through said oxygen preheater, directing said end product portion of said flue gas into a backpass volume having at least one heat exchanger in communication therewith at which heat from said end product portion is transferred to a working fluid flowing through said at least one heat exchanger.

20. A steam generator comprising:
a transport reactor that combusts a fuel in the presence of only a substantially pure oxygen feed stream in an amount sufficient to maintain a desired flow velocity, at or above a minimum threshold flow velocity, through said transport reactor to produce a flue gas, said flue gas containing solid material;
an oxygen source that provides substantially pure oxygen;
a fuel source;
a separator that separates the solid material from the flue gas;
a heat exchanger that receives the solid material, said solid material being directed to said transport reactor to contribute to the combustion process; and
a conduit wherein the solid material and the fuel and the substantially pure oxygen are mixed prior to further combustion;
wherein the solid material and the fuel and the substantially pure oxygen are mixed prior to being introduced into the transport reactor and the resulting mixture is introduced into the transport reactor through an inlet into the transport reactor to contribute to the combustion process.

* * * * *

UNITED STATES PATENT AND TRADEMARK OFFICE
CERTIFICATE OF CORRECTION

| | | |
|---|---|---|
| PATENT NO. | : 9,638,418 B2 | Page 1 of 1 |
| APPLICATION NO. | : 12/468290 | |
| DATED | : May 2, 2017 | |
| INVENTOR(S) | : Chiu et al. | |

It is certified that error appears in the above-identified patent and that said Letters Patent is hereby corrected as shown below:

On the Title Page

Item (57), under "ABSTRACT", in Column 2, Line 12, delete "exchange" and insert -- exchanger --, therefor.

In the Specification

In Column 5, Line 40, delete "limited to" and insert -- limited to, --, therefor.

In the Claims

In Column 8, Line 54, in Claim 20, delete "into the" and insert -- in the --, therefor.

Signed and Sealed this
Eleventh Day of July, 2017

Joseph Matal
*Performing the Functions and Duties of the*
*Under Secretary of Commerce for Intellectual Property and*
*Director of the United States Patent and Trademark Office*